(No Model.)  6 Sheets—Sheet 1.

H. POOLEY & J. PARKINSON.
GRAIN WEIGHING MACHINE.

No. 409,702.  Patented Aug. 27, 1889.

FIG. 1.

WITNESSES  INVENTORS (No Model.) 6 Sheets—Sheet 4.

H. POOLEY & J. PARKINSON.
GRAIN WEIGHING MACHINE.

No. 409,702. Patented Aug. 27, 1889.

FIG. 4.

WITNESSES

INVENTORS (No Model.) 6 Sheets—Sheet 5.
H. POOLEY & J. PARKINSON.
GRAIN WEIGHING MACHINE.

No. 409,702. Patented Aug. 27, 1889.

FIG. 5.

WITNESSES

INVENTORS (No Model.) 6 Sheets—Sheet 6.

H. POOLEY & J. PARKINSON.
GRAIN WEIGHING MACHINE.

No. 409,702. Patented Aug. 27, 1889.

WITNESSES

INVENTORS

UNITED STATES PATENT OFFICE.

HENRY POOLEY AND JOHN PARKINSON, OF LIVERPOOL, COUNTY OF LANCASTER, ENGLAND, ASSIGNORS TO HENRY POOLEY & SON, OF SAME PLACE.

GRAIN-WEIGHING MACHINE.

SPECIFICATION forming part of Letters Patent No. 409,702, dated August 27, 1889.

Application filed June 22, 1887. Serial No. 242,091. (No model.) Patented in England April 29, 1886, No. 5,813; in Austria-Hungary July 12, 1886, No. 42,198, and in Germany July 20, 1886, No. 39,635.

*To all whom it may concern:*

Be it known that we, HENRY POOLEY and JOHN PARKINSON, both subjects of the Queen of Great Britain, and both residing at Liverpool, in the county of Lancaster, in that part of the United Kingdom of Great Britain and Ireland called England, have jointly executed certain new and useful Improvements in Weighing-Machines for Weighing Grain, Seeds, and Granular and Pulverous Substances, (for which we have obtained patents in Great Britain, No. 5,813, dated April, 29, 1886; in Austria-Hungary, No. 42,198, dated July 12, 1886, and in Germany No. 39,635, dated July 20, 1886;) and we do hereby declare that the following is a full, clear, and exact description of the invention, which will enable others skilled in the art to which it appertains to make and use the same, reference being had to the accompanying sheets of drawings, which make a part of this specification, and to the letters and figures of reference marked thereon, like letters and figures being used to denote the same or corresponding parts throughout the drawings.

Our invention relates to that class of weighing-machines which are employed for automatically weighing grain, seeds, and granular and pulverous substances, and which at the same time register the quantities weighed.

In the carrying out of our invention we use the following parts, common to machines of this type, namely: a lever, preferably an equal-armed lever, made on the principle of a scale-beam, having at one end a receptacle or hopper for containing the material to be weighed, and at the other end a weight-scale. We also use a chute for feeding the material to be weighed into the weighing-receptacle and a register or counter.

According to our invention there exists a mechanism for operating the discharging-door of the weighing-receptacle; a peculiar form of catch and construction and arrangement of operating parts for locking and retaining the discharging-door of the weighing-receptacle locked in position; a mechanism for the disposal of the stream of material flowing from the chute during the time the weighing-receptacle is discharging; a mechanism so constructed and operating that the supply of material flowing into the weighing-receptacle shall be so gradually reduced that only the exact amount of material to complete the weighing can be received by the weighing-receptacle, this contrivance altogether dispensing with the necessary provision contained in other automatic weighing-machines of this class for compensating for the column of grain held in suspension after weight has been taken, and a mechanism which regulates the feed of grain or other substance to the weighing-machine.

The operation and construction of an apparatus provided with improvements according to our invention are as follows:

To the end of an equal-armed beam is suspended a receptacle or hopper for containing the grain or other substance to be weighed and at the other end a scale to receive the weights. On one side of the apparatus we provide a hammer, fixed vertically by preference and resting on knife-edges or other fixed bearings, and placed in such a position as to prevent its falling over until the actual load is weighed. The action of the hammer is limited, and is just sufficient to disengage a catch which retains the door of the weighing-receptacle in a closed position. The discharging door-catch consists of a lever of the first order, which is fulcrumed at one side near the bottom of the weighing-receptacle. The short arm of the lever is provided with jaws which catch the under side of the door of the weighing-receptacle, which is provided with rounded nose projections and with a balance-weight, so that the door when closing automatically engages with the jaw of the catch-lever. The catch-lever rod has a projection against which the hammer strikes or presses and communicates its action to the catch-lever and releases the discharging-door of the weighing-receptacle. On the hammer there is a slide, and a corresponding slide is fixed on the weighing-beam. These slides are so placed as to touch each other. The slide fixed to the weighing-beam upon its descent moves down the hammer until its poise is overcome, when it falls and strikes the projecting piece or tongue on the connecting-rod. This motion actuates the catch-lever and releases the discharging-door of the weighing-receptacle, which opens and allows its contents to discharge. As soon as the weighing-receptacle is emptied, the weighing-beam ascends and the hammer is returned to its normal position by the action of an arm which is fixed on and projects from the weighing-beam for this purpose. This projecting arm on the upward stroke or ascent of the weighing-beam returns the hammer to its poised or normal position by coming in contact with a projection on the foot of the hammer. The catch-lever being thus allowed to resume its normal position by the raising of the hammer, the discharge-door, which is closed by its counterpoise, automatically re-engages itself with the jaws of the catch-lever, and is thereby again locked in position.

Over the mouth of the weighing-receptacle there is mounted a basket or scoop receiver, which we term a "catch-grain." This catch-grain is free to turn, and is connected with the discharging-door of the weighing-receptacle. As the weighing-receptacle discharges its load, the falling of the door of the receptacle immediately turns up the catch-grain, which then receives the grain or other material from the feeding-chute, which would otherwise flow into the weighing-receptacle. When the weighing-receptacle is emptied, its door closes, and is held closed by the catch-lever, and the act of closing the door tilts the catch-grain, which then empties its contents into the weighing-receptacle. The catch-grain may be so mounted on the weighing-receptacle and under the feeding-chute that when the stream of grain or other material is flowing from the feeding-chute into the weighing receptacle it passes over the catch-grain and is never in contact with the catch-grain.

In order to insure perfect accuracy in the weighing, there is provided, in connection with the counter-balance or weight-scale of the weighing-beam, a mechanism consisting of a spring or springs or weights, the effect of which is to allow the weighing-beam to descend or come into equipoise gradually and easily, so as to gradually cut off the supply of material by allowing a weighted valve to close, which valve is provided on the feeding-chute and is directly controlled by the motion of the weighing-beam as the beam moves. The result is that when the weighing-beam is in equilibrium, and when the weighing-receptacle contains its right load, the feed has been gradually reduced to a minimum, and the least addition causes the scale to turn and the hopper to discharge its contents.

By our invention the compensation which is so objectionable a feature in other automatic scales is entirely overcome. By disconnecting the cut-off valve and the hammer the scale becomes an ordinary equal-armed balance, and may be used to test the accuracy of its own weighing, as hereinafter set forth.

Figure 4:
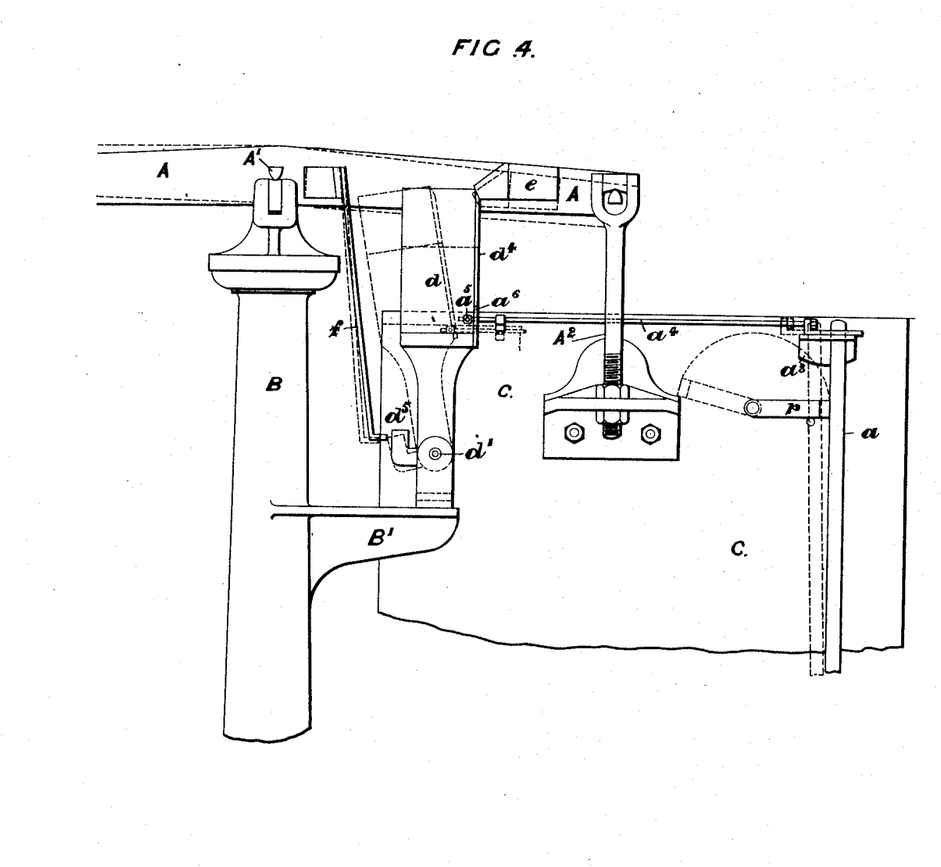
Fig. 4 illustrates the discharging-hammer mechanism in detail.
Figure 5:
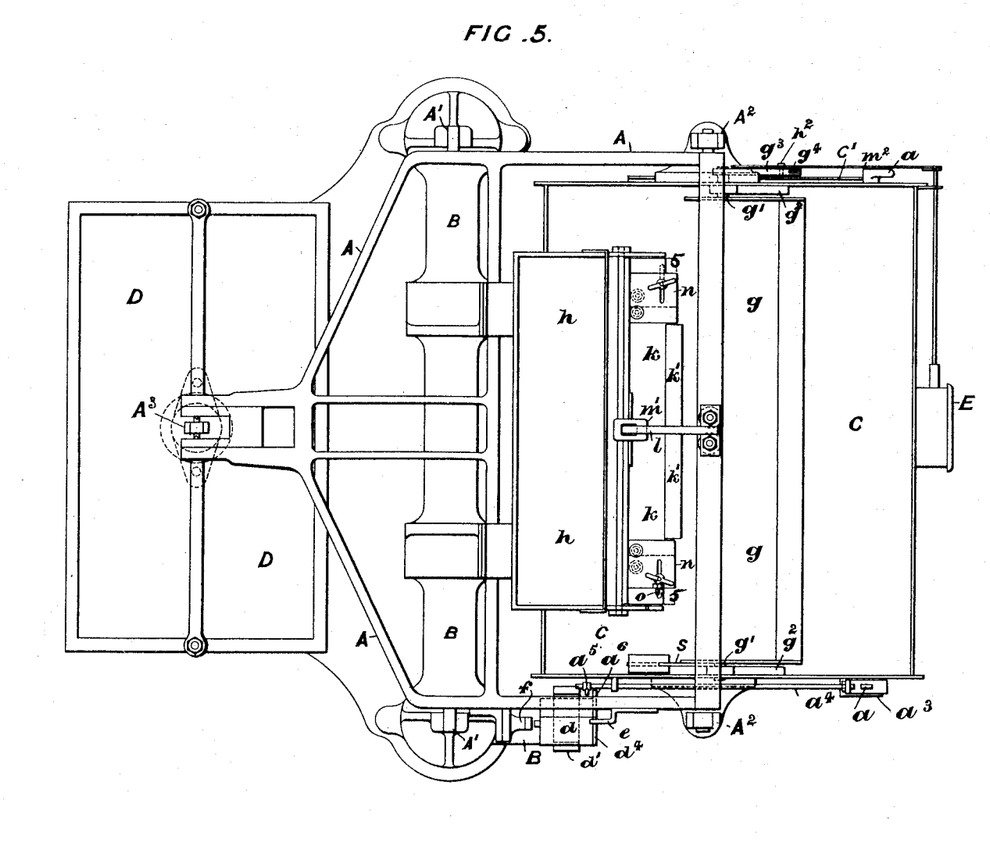
Fig. 5 is a plan of the machine.
Figure 6:
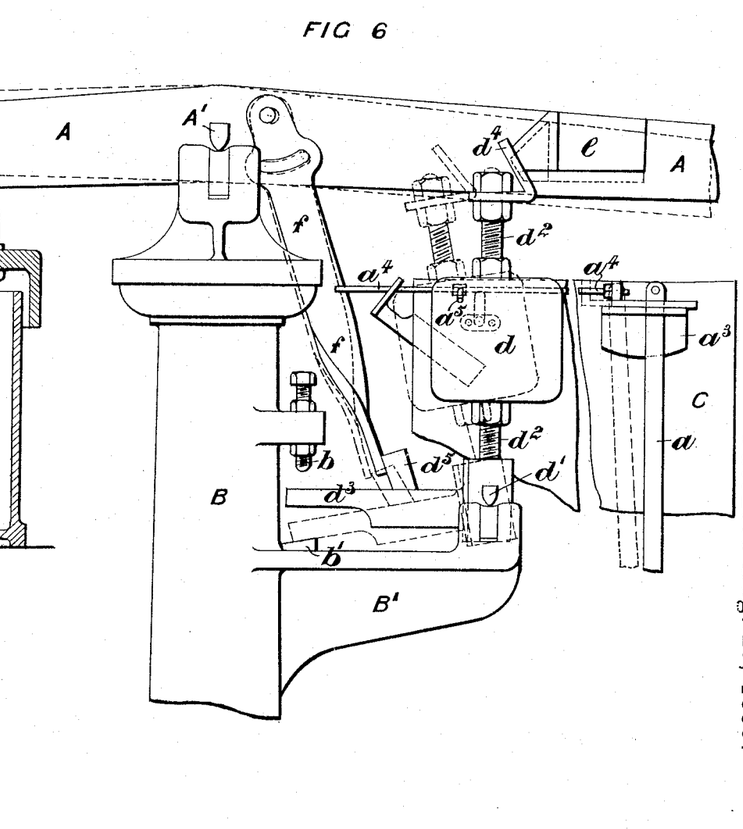
Fig. 6 shows a modified construction of the discharging-hammer mechanism.

With reference to the drawings, A is an equal-armed beam, the fulcra A' or middle knife-edges of which are carried by columns or frame-work B. One end of the beam A has suspended from it by the adjustable links $A^2$, a receptacle or hopper C, for containing the grain or other substance to be weighed. From the other end of the beam A there is suspended, by the adjustable link $A^3$, a scale or weight pan D, hereinafter described, to receive the weights. On one side of one of the columns B there is provided a bracket B', which serves to sustain the hammer $d$, fixed nearly vertically, by preference, as shown at Figs. 4 and 6, and resting on a bearing $d'$, and so placed as to prevent the hammer $d$ falling over until the actual load is weighed. The position of the hammer $d$ is fixed, as in Figs. 1 and 4, or adjustable, as in Fig. 6, on its vertical spindle $d^2$, which is pivoted at its foot upon the knife-edges $d'$. The vertical spindle $d^2$, Fig. 6, carries a projecting arm $d^3$, which limits the action of the hammer $d$ just sufficiently to disengage the catches $a$, which retain the door C' of the weighing-receptacle C in a closed position. The action of the hammer $d$ in Fig. 6 is limited by a set-screw $b$ and a stop $b'$ on the column B. The catch $a$ consists of a lever having two jaws $a^2$, mounted on and fulcrumed by the bar $a'$. The two jaws $a^2$ of the catch-lever $a$ are arranged one on either side of the receptacle C and catch the under side of the door C' of the weighing-receptacle C, which is provided with rounded nose projections $C^2$.

To effect the engagement of the catches $a$ with the projections $C^2$ when the door closes, they are each provided with a curved piece or hook $a^7$. Upon the closing of the door C' the rounded nose projections $C^2$ come in contact with the under side of the curved pieces $a^7$, and so draw the catches $a$ upward and the jaws $a^2$ under the door C'. The door C' is further provided with a balance-weight $C^3$, so that the door C' closes automatically, and in so doing engages with the jaws $a^2$ of the catch-lever $a$. The long arm of the catch-lever $a$ is carried up the side of the receptacle C and passes through a slot in a bracket $a^3$ at the top of the receptacle C, the bracket $a^3$ holding the long arm of the catch $a$ in position and the slot providing for the stroke of the lever $a$.

Passing horizontally along the top of the same side of the weighing-receptacle C as the catch-lever $a$ there is a rod $a^4$, adjustably connected at one end to the long arm of the catch-lever $a$. The other end of this rod $a^4$ has a projection $a^5$, against which a projection $a^6$ on the hammer $d$ strikes or presses when it falls and thus communicates its action to the catch-lever $a$, and thereby releases the discharging-door $C'$ from the holding-jaws of the lever $a$. On the top of the spindle $d^2$ of the hammer (see Fig. 6) and upon the hammer (see Figs. 6 and 4) there is a slide $d^4$, having an inclined face, and a corresponding slide $e$ is fixed on the weighing-beam A. These slides $d^4$ and $e$ are placed so as to touch each other in the normal condition of the machine. The slide $e$, being fixed to the weighing-beam A, upon its descent moves down the inclined face of the slide $d^4$ upon the hammer until the poise of the hammer $d$ is overcome, when the hammer $d$ falls over and the projection $a^6$ strikes the projecting piece or tongue $a^5$ on the connecting-rod $a^4$. This motion actuates the catch-lever $a$ and releases the discharging-door $C'$ of the weighing-receptacle C, which opens and allows its contents to discharge. As soon as the weighing-receptacle C is emptied, the weighing-beam A ascends, and the hammer $d$ is returned to its normal position by the action of the arm $f$, which is fixed on and projects from the weighing-beam A for this purpose. This projecting arm $f$, on the upward stroke or ascent of the weighing-beam A, returns the hammer $d$ to its normal or poised position by coming in contact with the projection $d^5$. The catch-lever $a$ is thus allowed to resume its normal position by the raising of the hammer $d$. The discharge-door $C'$ is closed by its counterpoise $C^3$, and the rounded nose projections $C^2$ automatically re-engage with the jaws $a^2$ of the catch-lever $a$, and the door is thereby again locked in position.

Over the mouth of the weighing-receptacle A there is a basket or catch-grain $g$. This basket-receiver or catch-grain $g$ is carried by trunnions $g'$, working in the brackets $g^2$, attached to the sides of the receptacle C, so that it is free to turn on the trunnions $g'$, and is connected by a lever $g^3$ and rod $g^4$ with the discharging-door $C'$ of the weighing-receptacle C, so that as the weighing-receptacle C discharges its load the falling of the door $C'$ of the receptacle C, through the rod $g^4$ and lever $g^3$, immediately turns up the catch-grain $g$, as shown in dotted lines in Fig. 2, so that the catch-grain then receives the grain or other material flowing from the feeding-chute $h$, which would otherwise flow into the weighing-receptacle C. When the weighing-receptacle C has discharged its contents, its door $C'$ closes by means of its counterpoise $C^3$ and is held closed by means of the jaws $a^2$ of the catch-lever $a$, and the act of closing the door $C'$ tilts the catch-grain $g$ into the position shown in Fig. 1, so that the catch-grain $g$ then empties its contents into the weighing-receptacle C. The catch-grain $g$ is so mounted on the weighing-receptacle C and under the feeding-chute $h$ that when the stream of grain or other material is flowing from the feeding-chute $h$ into the weighing-receptacle C it strikes the catch-grain $g$ and falls into the receptacle.

As an alternative, instead of closing the discharging-door $C'$ by means of a weight $C^3$, carried by a projecting arm or arms from the door itself, it may be closed from the catch-grain basket by a lever and weight S.

Figure 1:
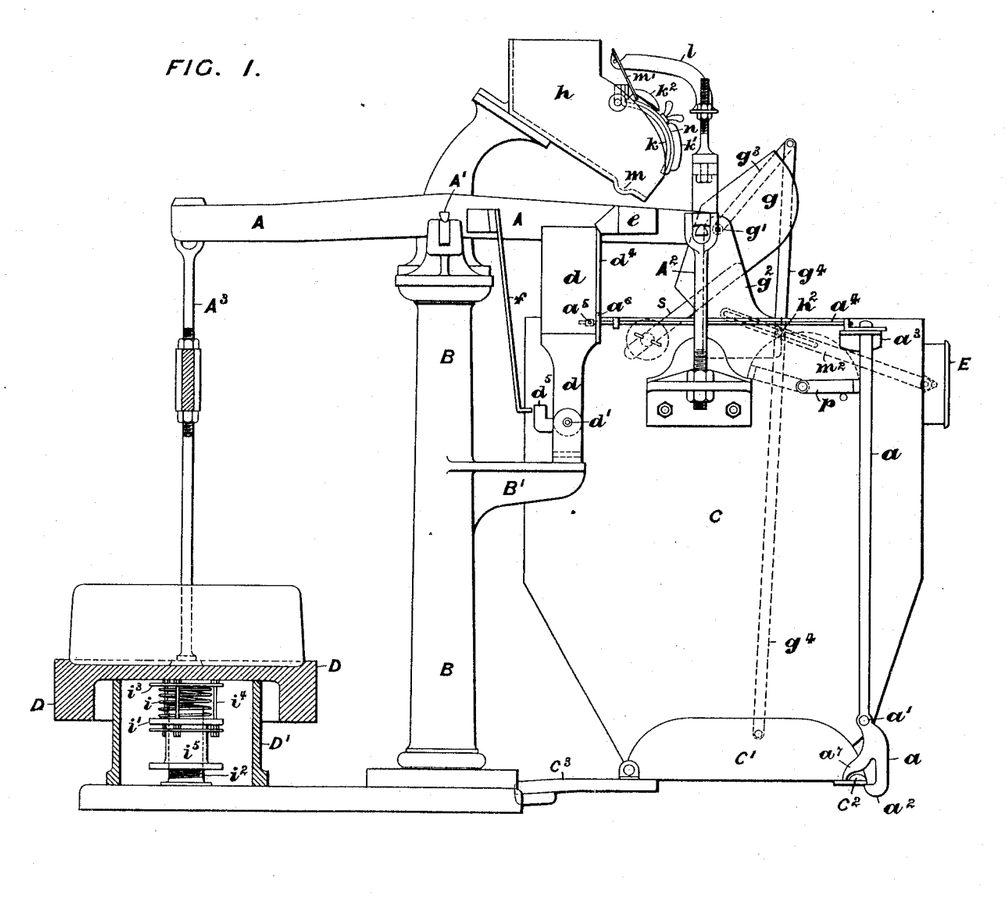
Figure 1 is a side elevation of a machine constructed according to this invention.
Figure 2:
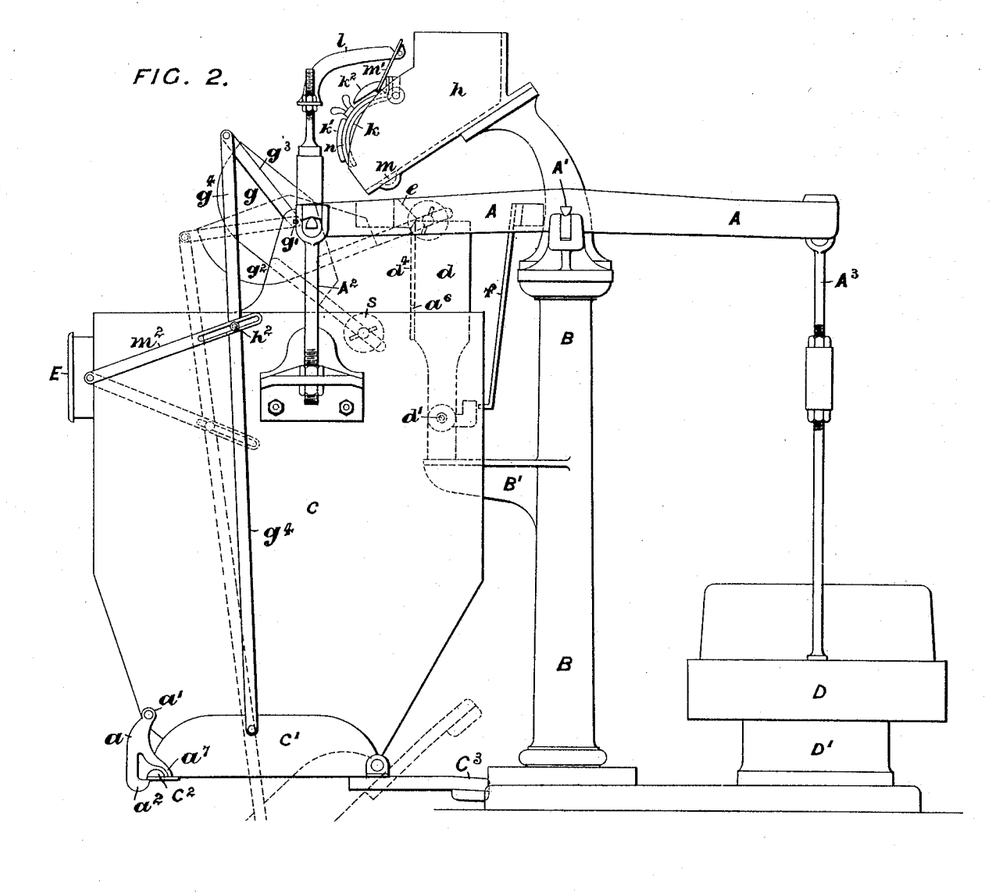
Fig. 2 is an elevation of the reverse side of the machine shown at Fig. 1.
Figure 3:
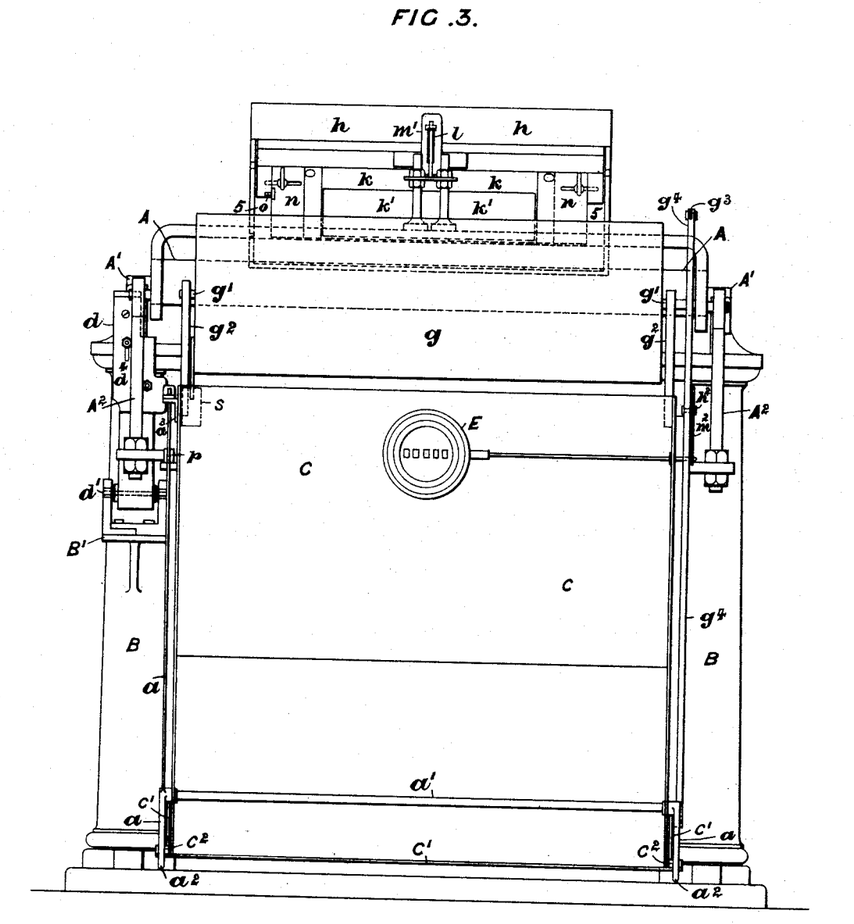
Fig. 3 is a front end view of the machine.

In order to insure perfect accuracy in weighing, the weight-plate D of the weighing-beam A is provided with a weighing mechanism by which the weight on the beam is reduced. In Fig. 1 of the drawings a spring mechanism is shown. This consists of a means whereby we obtain an automatic compensator for the column of grain or other material which necessarily would fall into the weighing-hopper after true weight has been obtained. The apparatus is arranged as follows: A base $i^2$, preferably of brass, is attached to the base-plate underneath the weight-plate of the machine or counter-balance D, as shown in the drawings, which carries the main weight. This casting has a screw-thread upon it and carries a nut $i'$, upon which is placed a spring $i$, which presses against the under side of the counter-balance or weight-plate.

In order to prevent the spring falling off or being displaced, it is covered by a plate $i^3$, provided with rods $i^4$, passing loosely through holes in the nut $i'$ and having screw-threads turned upon them which carry nuts to prevent them coming out. Thus when the spring $i$ is compressed the plate $i^3$, with the rods, is free to move downward; but when the weight-plate moves up the spring can only follow it until checked by the nuts on the rods.

The nut carrying the spring is screwed up to its proper position under the weight-plate and then followed up by a lock-nut $i^5$, which keeps it securely in position.

By arranging the weight-reducing mechanism under the weight-plate and inclosing it in the box D' the mechanism is so placed that it cannot be tampered with.

Figure 7:
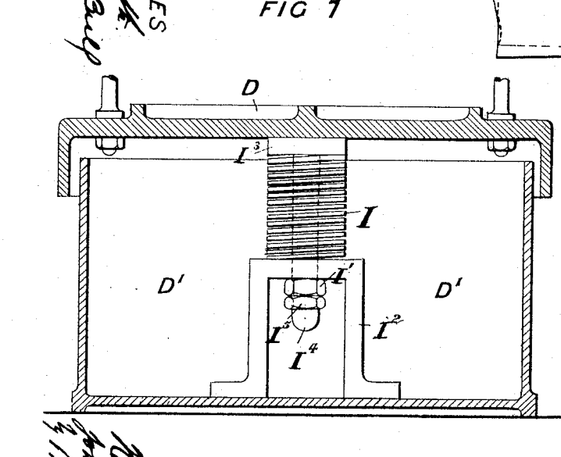
Fig. 7 is an elevation of a modified form of the weight-reducing mechanism shown in Fig. 1.

In Fig. 7 there is shown a modification of the weight-reducing mechanism shown at Fig. 1 for dealing with the grain or other material which passes into the hopper after the weight has been attained. In this case the bracket 12 is attached to the base-plate underneath the weight-plate D of the machine. This bracket carries a spindle 14, provided with a head 13 and with an adjusting-nut I' and a lock-nut 15. The spring I is placed round the spindle 14, between the bracket 12 and the spindle-head 13, and the mechanism is contained in the box D', and its action is the same as the mechanism shown at Fig. 1.

The effect of this mechanism and construction of the weight-plate D is to allow the weighing-beam A to descend gradually and easily when weighing, so as to gradually allow a weighted valve $k$, which is provided on the mouth of the feeding-chute $h$, to close, the said valve $k$ being directly controlled by the motion of the weighing-beam A by means of an arm $l$ thereon, which arm $l$ recedes as the weighing-beam A descends. The result is that when the weighing-beam A is in equilibrium, and therefore when the weighing-receptacle C contains its right load, the receding of the arm $l$ to the extent given by the spring $i$ on the weight-plate D reduces the feed through the chute $h$ to a minimum, and the least addition causes the scale to turn and the receptacle C to discharge its contents.

In the feeding-spout $h$ is a groove $m$, cast or machined in, into which the edge of the valve $k$ falls, in order to provide a cushion for the better cut-off of grain or other material. The cut-off door or valve $k$ has a weight $k'$, which is sufficient to close the valve when unsupported. Each side of the valve is cut away and provided with apertures 5, so as to allow for the final feed making up of the exact weight of material and turning the scale. A projection $k^2$ is attached to the valve $k$, and is connected to the arm $l$, fixed upon the weigh-beam A by a link $m'$. The apertures just described are provided with slides $n$, by which they may be more or less covered or exposed, as may be required.

The scale may be made to check or test its own weighings without the aid of a separate machine or scale-beam by the following arrangement: On the main hopper C is placed a small tumbling-catch $p$, which, when in the first position shown in Fig. 1 of the drawings, locks the releasing catch-lever $a$ and prevents the discharge-door C' opening. Having thus locked the discharge-door and having nearly filled the main hopper, the supply of grain or other material is momentarily checked, and the right-hand slide $n$ on the cut-off door $k$ moved to the position shown in dotted lines on the drawings, thus closing one of the apertures with which the cut-off door is provided for the purpose of giving the final feed necessary to turn the scale when the cut-off door is closed. The supply is then turned on again and the grain or other material trickles slowly through the remaining aperture until the beam is level and the weights on the scale-pan balanced. The instant this takes place the left-hand slide $n$ is closed. This slide is provided with a projection $o$, which, when it closes, fits into a recess on the feeding-spout, and thus completely locks the feeding-door $k$ and prevents the passage of any of the material to be weighed to the main hopper.

E is a counter or register, which may be of any approved type. It is mounted on the receptacle C, and worked by the lever $m^2$, which is operated by a pin $h^2$ on the rod $g^4$ of the door C'.

By this invention the compensation, which is so objectionable a feature in other automatic scales, is entirely overcome. By disconnecting the cut-off valve and the hammer the scale becomes an ordinary equal-armed balance, and may be used to test the accuracy of its own weighing, as above described.

The operation of the machine is as follows: Say the weight of material to be weighed is one hundred pounds and the weight of materials of which the balancing portion of the apparatus is made balance one another on each side, as is the case with that set forth with reference to Figs. 1 to 6 of the drawings. A dead-weight of one hundred pounds is placed on the weight-plate, and the spring $i$, say, exerts a total pressure of five pounds. The exertion due to the spring will be continued against that of the dead-weight until the lever or beam A is in equipoise or level, when the scale-pan or weight-pan rises off it and the full weight of one hundred pounds is exerted. When the weighing-receptacle is empty and the door shut, the positions of the parts are as shown in the drawings, namely: the valve $k$ is open and the catch-grain $g$ inclined in a downward direction. Upon the material to be weighed being turned in it flows through the chute $h$ and into the receptacle. When the weight in the receptacle has reached the one hundred pounds minus the upwardly-exerted weight—five pounds—of the spring—namely, ninety-five pounds—the beam or lever will be gradually brought into equipoise. By this action of coming into equipoise the piece $e$ has brought up the hammer $d$ into about equipoise, and the standard $l$, being on the beam A, will have fallen and so allowed the valve $k$ to have fallen and cut off the supply to the receptacle C, except the streams which flow through the apertures in the valve. The amount of the streams will have to be about equal to the weight exerted by the spring $i$. As soon as the weight of material fallen into the receptacle C has reached the required quantity, it causes the beam to fall, and in so doing, through the construction and arrangement of the hammer and the piece $e$, causes the weight $d$ to fall forward, as set forth, and disengage the catch $a$. The weight of material in the receptacle then forces the door C' open, by which action the catch-grain is tipped upward, as shown and described, and the material, still flowing from the chute $h$ through the apertures in the valve $k$, is thus caught and prevented from flowing into the receptacle when once the full weight therein has been reached. As soon as the receptacle is empty, all the parts assume their former positions, and the grain caught in the catch-grain $g$ during the time of discharging of the receptacle is the first to be thrown into it. In this way the automatic weighing and the actions above set forth are repeated.

The action of the weighing-beam in weighing the load is unaffected and almost entirely freed from friction in respect of the various motions which control the cut-off valve, hammer, and discharge. The accuracy, therefore, is not affected by the various motions hereinbefore described, all parts being returned to their functional position by the upward movement of the weighing-beam after the load has been weighed and discharged.

Having fully described our invention, what we claim is—

1. In an automatic weighing-machine of the type herein described, the combination of the catch-grain $g$, for receiving the flow of grain after the weighing of the material is completed, having trunnions $g'$ mounted and working in bearings attached to the sides of the receptacle C, in combination with the discharging-door $C'$ and connecting-lever $g^3$, whereby the said catch-grain $g$ is operated and the flow of grain, after full weight is reached, is caught, substantially as and for the purposes set forth.

2. The combination, with the weight-plate of a weighing-machine, of a screwed base $i^2$, nut $i'$, lock-nut $i^5$, spring $i$, and a guard consisting of the plate $i^3$ and rods $i^4$, all arranged and operating substantially as and for the purpose shown and described.

3. In a weighing-machine, the combination, with the weigh-beam thereof, of a slide $e$, a weight or hammer $d$, rod $a^4$, lever $a$, catches $a^2$, and receptacle C, having a door $C'$, and projections $C^2$, all arranged and operating substantially as and for the purpose shown and described.

4. In a weighing-machine, the combination, with a feed-chute $h$, of a valve $k$, link $m'$, device $l$, weight-beam A, weight-plate D, and spring $i$, substantially as described.

5. In a weighing-machine, the combination, with a feed-chute, of a groove over which the grain leaving said chute passes, so that said groove is constantly filled with grain, and a valve the edge of which falls into said groove when closed, which forms a cushion therefor, substantially as described.

6. In a weighing-machine, the combination of a cut-off valve having an aperture for the passage of grain after the valve is closed, and an adjustable shutter attached to said valve to control the size of said aperture, substantially as described.

7. In a weighing-machine of the type herein set forth, the combination, with the discharging-door $C'$, of the receptacle C, the counterbalance-weight $C^3$, catch-lever $a$, catch-jaws $a^2$, rod $a^4$, hammer $d$, and slide $e$, operating together, and whereby the door $C'$ is opened and the receptacle C discharged, and when discharged the door $C'$ is closed and held, substantially as set forth.

8. In a weighing-machine of the type herein set forth, the catches $a$, having jaws $a^2$, and a hook $a^7$, mounted on fulcra $a'$, in combination with the rounded nose projections $C^2$ of the door $C'$, whereby the automatic engagement of the catch-lever $a$ with the discharging-door $C'$ is effected, as set forth.

9. The combination of the spring $i$, base $i^2$, plate $i^3$, rods $i^4$, and lock-nut $i^5$, substantially as and for the purposes set forth.

HENRY POOLEY.
JOHN PARKINSON.

Witnesses:
F. J. P. CHEESBROUGH,
J. A. COUBROUGH,
*Both of 15 Water Street, Liverpool, England.*